United States Patent [19]
Yang

[11] Patent Number: 5,620,173
[45] Date of Patent: Apr. 15, 1997

[54] DOUBLE-ACTING DISTRIBUTED PRESSURE VIBRATION PROOF STRUCTURE

[76] Inventor: Tai-Her Yang, No. 32 Lane 29, Taipin St., Si-Hu Town, Dzan-Hwa, Taiwan

[21] Appl. No.: 442,097

[22] Filed: May 16, 1995

[51] Int. Cl.$^6$ ................................................. B60G 11/14
[52] U.S. Cl. ..................... 267/253; 267/248; 267/173; 267/228; 267/289
[58] Field of Search ........................ 267/228, 248, 267/251, 253, 286, 289, 166, 167, 173, 174; 280/688, 690, 724, 725

[56] References Cited

U.S. PATENT DOCUMENTS

| | | | |
|---|---|---|---|
| 1,333,999 | 3/1920 | Smith | 267/253 |
| 2,005,513 | 4/1935 | Weaver | 267/253 |
| 2,119,052 | 5/1938 | Palmer | 267/253 X |
| 2,352,446 | 6/1944 | Pointer | 267/253 X |
| 2,753,178 | 7/1956 | Zakarian | 267/253 |
| 3,473,822 | 10/1969 | Fitch | 267/253 X |
| 3,638,963 | 2/1972 | Van Leeuwen | 267/253 X |

FOREIGN PATENT DOCUMENTS

| | | | |
|---|---|---|---|
| 575318 | 7/1924 | France | 267/253 |
| 291289 | 4/1916 | Germany | 267/248 |

Primary Examiner—Peter M. Poon
Attorney, Agent, or Firm—Bacon & Thomas

[57] ABSTRACT

A double-acting distributed pressure vibration proof structure is comprised of three or more than three relatively iter-linked bodies, whereof each inter-linked body is coupled with the respective end joint hinges and the middle joint hinge to the V-shaped two-arm structure, thereof the vibration spring is installed respectively on each end joint hinge of the V-shaped two-arm structure, as well as between the middle joint hinge of the V-shaped two arm structure and the inter-linked body coupled with one end of one arm of the V-shape two-arm structure. An interacting three-joint hinges structure is embodied through each end joint hinge of the V-shaped two-arm structure and the hinge structure between the middle joint hinge and the joint hinge of each linked carrier to constitute a multi-vibration absorptive double-acting distributed pressure vibration proof structure. A limiting structure comprised of the two-staged dragging arm can be further installed as required between the middle joint hinge structure and the carrier coupled with one of the arm structure, in which the middle joint of the two-staged dragging arm can be bent freely. One end of the arm can be to coupled with the middle joint of the V-shaped two-arm structure, while the other end can be freely swung to couple with the carrier coupled with one arm or the two-arms structure, to constitute a double-acting distributed pressure vibration proof structure capable of limiting the arm swing angle.

7 Claims, 3 Drawing Sheets

DOUBLE-ACTING DISTRIBUTED PRESSURE VIBRATION PROOF STRUCTURE

SUMMARY OF THE INVENTION

Traditional swing arm vibration proof structures are widely applied in various machines and vehicles, due to their simple structures. The design typically uses a single swing dragging arm structure which has to be as light weight as possible in order to have better agility as well as to reduce losses. A design difficulty may arise when the dragging arm's weight has to be increased to bear a heavier structure. To overcome the above drawbacks, the applicant has disclosed a double-acting distributed pressure vibration proof structure to provide the double-acting distributed pressure and to increase the weight bearing capacity of the dragging arm structure.

DETAILED DESCRIPTION OF THE PREFERRED EMBODIMENTS

The double-acting distributed pressure vibration proof structure is comprised of three or more relatively iter-linked bodies, whereof each inter-linked body is coupled with the respective end joint hinges and the middle joint hinge of the V-shaped, two-arm structure. A vibration spring is installed on each end joint hinge of the V shaped two-arm structure as well as between the middle joint hinge of the V-shaped two-arm structure and the inter-linked body coupled with one end of one arm of the V shape two-arm structure. An interacting three-joint hinge structure is embodied through each end joint hinge of the V-shaped two arm structure and the hinge structure between the middle joint hinge and the joint hinge of each linked carrier to constitute a multi-vibration absorptive, double-acting distributed pressure vibration proof structure. A limiting structure comprised of the two-staged dragging arm can be further installed as required between the middle joint hinge structure and the carrier coupled with one of the arm structure, whereof the middle joint of the two-staged dragging arm can be bent freely. One end of the said arm can be swung freely to couple with the middle joint of the V-shaped two-arm structure, while the other end can be freely swung to couple with the carrier coupled with one arm of the two-arm structure, to constitute a double-acting distributed pressure vibration proof structure capable of limiting the arm swing angle.

Figure 1:
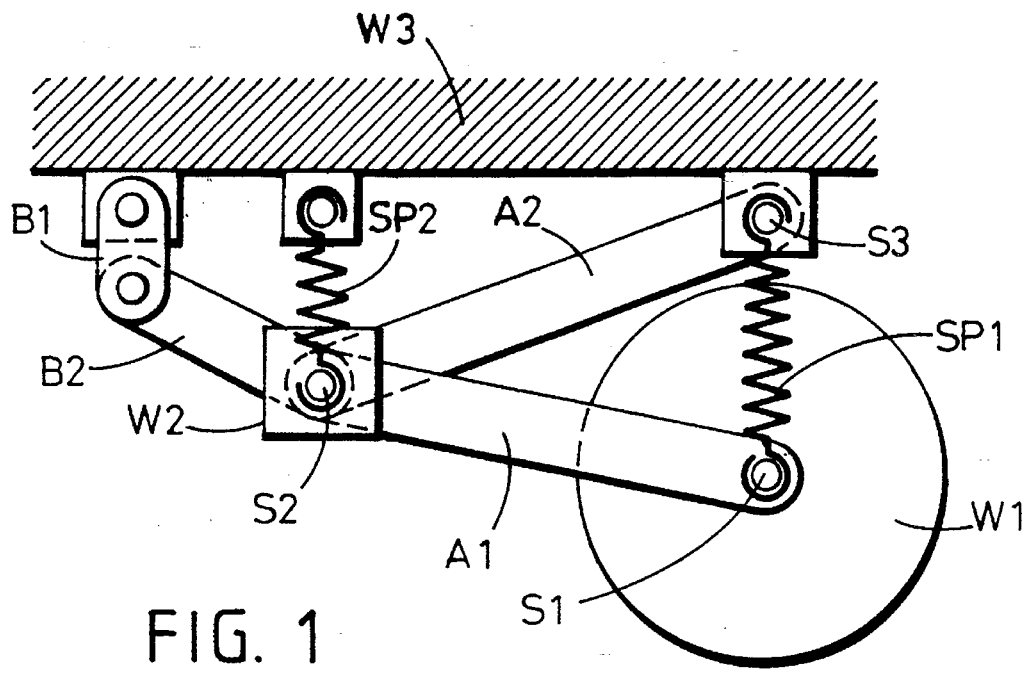
FIG. 1 is a schematic side view diagram of the invention.
Figure 2:
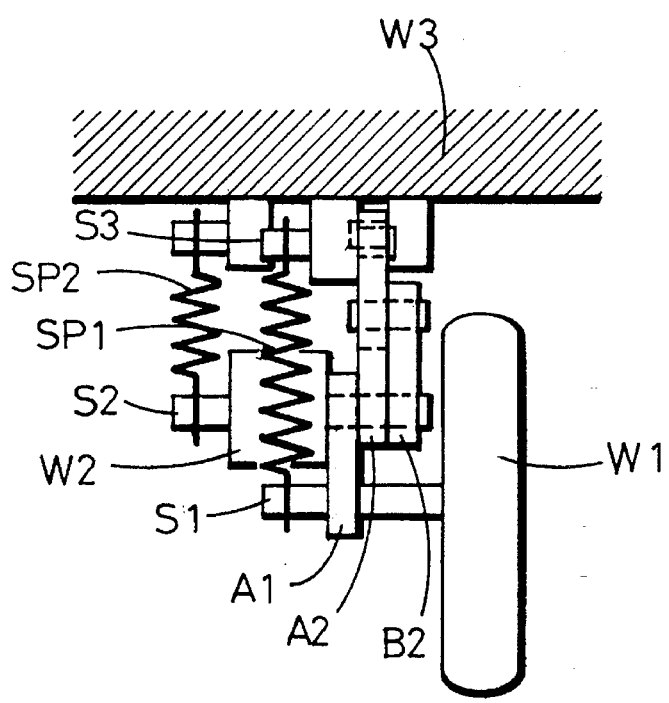
FIG. 2 is a rear view of the structure shown in FIG. 1.

FIG. 1 is a schematic diagram of the basic invention, and FIG. 2 is a rear view of the structure of FIG. 1. It is comprised of a V-shaped two-arm structure, comprised of a first arm A1 and a second arm A2 oriented in a V-shape with a variable intersection angle. A joint hinge structure S2 is provided at the two arms coupling location for connection with a structure body or carrier W2 with driving angular translation property (including the rotational power source) and for installing the swing end joint of a vibration spring SP2. The joint hinge structure S2 is utilized to provide angular variation between the first arm A1 and the second arm A2. The carrier W2 and the vibration spring SP2 are combined separately on the V-shaped two-arms middle joint structure. The vibration spring SP2 is installed between the V-shaped two-arm jointed structure and the carrier W2, and the carrier W3. The extended end of the first arm A1 is installed with a joint hinge structure S1 for attachment to a carrier W1 (or other carriers) with angular translation and for connecting the swing end of the vibration spring SP1. Alternatively, the joint hinge structure S1 is not installed, but the end of the first arm A1 is combined with the carrier W1 and the end of the vibration spring SP1, while the extended end of the second arm A2 is installed with a joint hinge structure S3 for attachment to a carrier W3 (or other carriers) with angular translation and for installing the swing end of the vibration spring SP1. Alternatively, the joint hinge structure S3 is not installed, and the end of the second arm A2 is combined with carrier W3 and the end of the vibration spring SP1 so as to constitute a multi-vibration absorptive, double-acting distributed pressure vibration proof structure. For the applications in which the carriers W1 and W3 are made in reversed translations, a limiting structure comprising two-staged dragging arms B1, B2 can be further installed between the middle joint hinge structure S2 and the carrier W3 coupled with one of the arms structure A2. The middle joint of the two-staged dragging arm can be bent freely, and one of its ends can be coupled with the middle joint hinge structure S2 of the V-shaped two-arm structure, while the other end can be coupled with the carrier W3 to limit the range of the swing working angle between the second arm A2 and the carrier W3. The above system structure is bearable with the active impact between the carriers W1 and W3 as well as the passive impact of the carrier W2, whereby the above said structure has the following functions:

1) To bear the active impact from the carrier W1 and W3;
2) To bear the passive impact generated by item 1);
3) The distance between the carriers W2 and W1 remains the same when the two arms are swung under the impact force;
4) The distance between the carriers W2 and W3 remains the same when the two arms are swung under the impact force;
5) For carriers W1 and W3 used in the application of reverse translation, the dragging arms B1 and B2 are provided for limiting the swing angle between the second arm A2 and the carrier W3.

Figure 3:
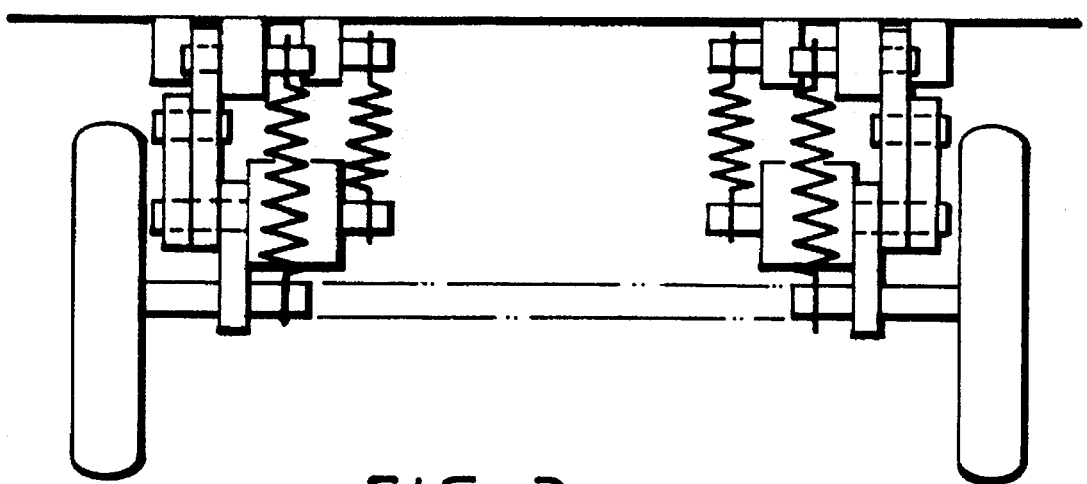
FIG. 3 is a rear view illustrating an application of the invention having two-sets of structures to commonly bear a load.

The aforesaid double-acting distributed pressure vibration proof structure can be adopted with two, or more than two, inter-linked structures to commonly bear the load such as the vibration structure used between a car body and a wheel axle. FIG. 3 is a front view illustrating an application of two sets of the invention to commonly bear the load. Some or all of the carriers installed at the same positions of the respective joint hinge structure of the V-shaped two-arm structure are mutually combined or uniformly integrated in a common structure. Based on the characteristics of the matching carriers the following multiple inter-linked modes can be made:

A double-acting distributed pressure vibration proof structure can be constituted by two or more than two units, each joint hinge structure of the V-shaped two-arm structure can be installed with carriers, wherein at least one joint hinge structure or carrier is constituted by two independent elements mutually combined and interlocked, or by an integrated common structure, the rest of the other two joint hinge structures or carriers can be made in independent and free force bearing embodiments.

A double-acting distributed pressure vibration proof structure can be constituted by two, or more than two, units, each joint hinge structure of the V-shaped two-arm structure can be installed with carriers, wherein at least two joint hinge structures or carriers are constituted by two independent elements mutually combined and interlocked or by an integrated common structure, the third joint hinge structure or carrier can be made in an independent and free force bearing embodiment.

A double-acting distributed pressure vibration proof structure, wherein the V-shaped two arm joint hinge structure can be further installed with rotational power units such as motors, engines load output shafts and transmission devices, wherein the drive shaft of the prime power unit can be the same shaft of the joint hinge structure S2, the output shaft can be the same shaft of the joint hinge structure S1, or the drive shaft of the power unit and both, or one of the output shafts are respectively in different shafts with the first arm joint hinge structure S1 or the two-arm joint hinge structure S2.

As the car body constituting the carrier W3 and the ground constituting the carrier W1 are in a reversed translation state, a limiting structure constituted by the two-staged dragging arms B1 and B2 can be further installed as required between the middle joint hinge structure and the carrier W3 coupled with one of the arm structures A2, wherein the middle joint of the two-staged dragging arms can be bent freely, whereof one of its ends can be coupled with the middle joint hinge structure S2 of the V-shaped two-arm structure, whereas the other end can be coupled with the carrier W3 coupled with one arm of the V-shaped two-arm structure to limit the range of the swing working angle, thereof the above said two-staged limiting structure can be omitted or installed with one, or more than one, units as required.

To enhance the agility of the applications, no matter that the aforesaid double-acting distributed pressure vibration proof structure is in a single unit or multi-interlinked units embodiment, it is further characterized that the center of inertia of the power unit or other mechanisms which constitutes the carrier W2 can be located at, or near to, the axis of the joint hinge axis of the V-shaped two-arm unit.

Figure 4:
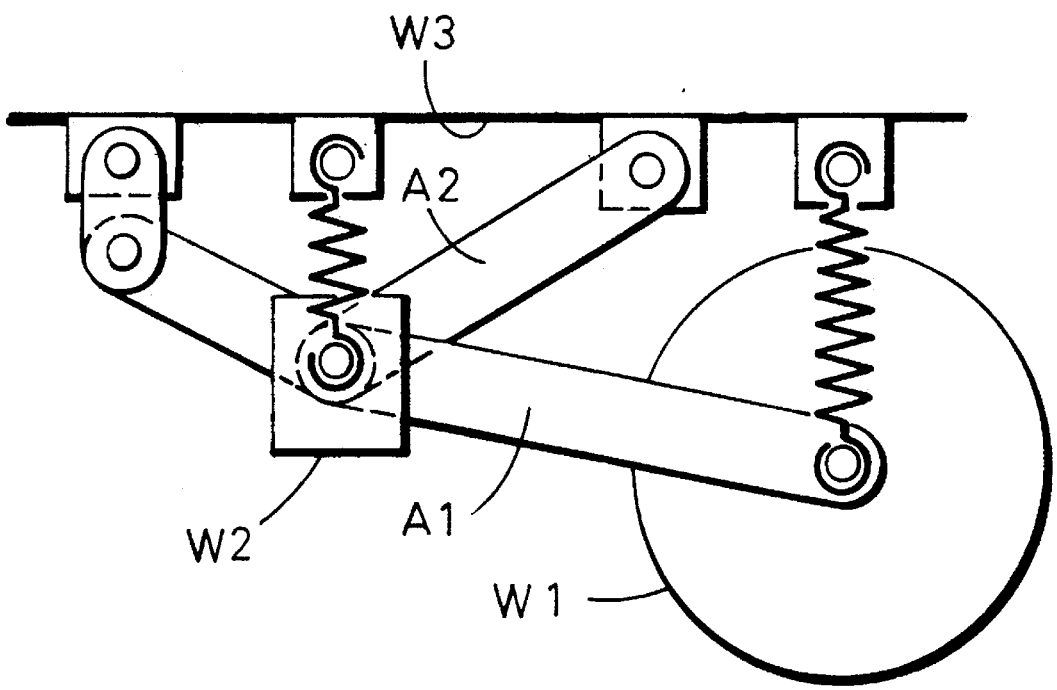
FIG. 4 is a schematic side view of the invention illustrating the location selection of the second arm.

For practical arrangement of the relative interaction between the arms and carriers, the joint hinge structure which combines the second arm A2 and the carrier W3 can be located between the locations of the joint hinge structures where the vibration springs SP1, SP2 and the carrier W3 are respectively combined, whereas FIG. 4 is a schematic example of the invention illustrating the location selection of the second arm.

Figure 5:
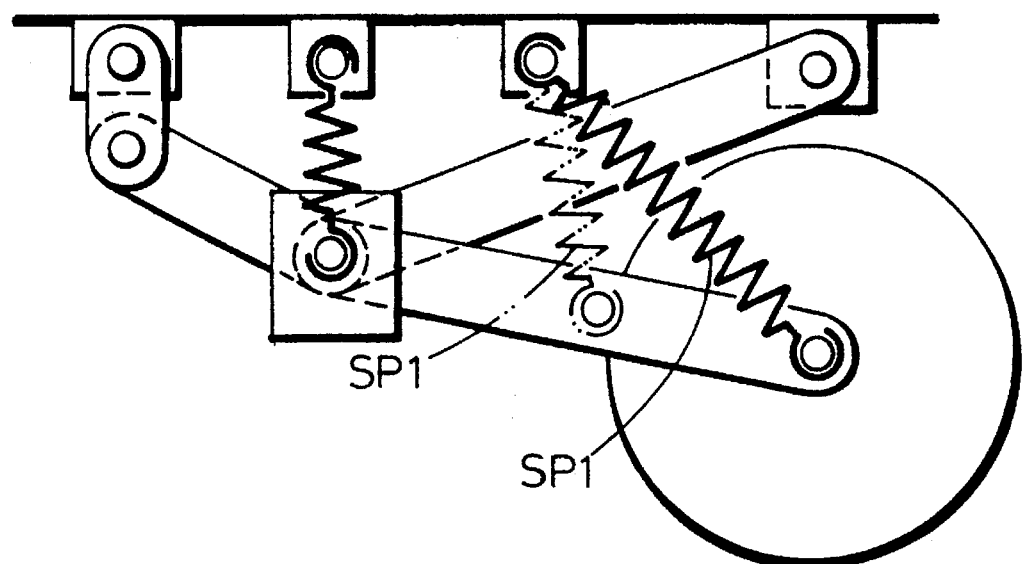
FIG. 5 a schematic side view of an alternative embodiment of the invention illustrating the location selection of the vibration proof structure.

The design is further characterized in that one end of the vibration spring SP1 is installed between the locations of the joint hinge structures where the second arm A2 and the vibration spring SP2 are combined with the carrier W3, whereas the other end of the vibration spring is installed on the joint hinge structure of the carrier W1 or the first arm A1, wherein the embodiment shown in FIG. 5 is the first schematic example of the invention illustrating the location selection of the vibration proof structure.

Figure 6:
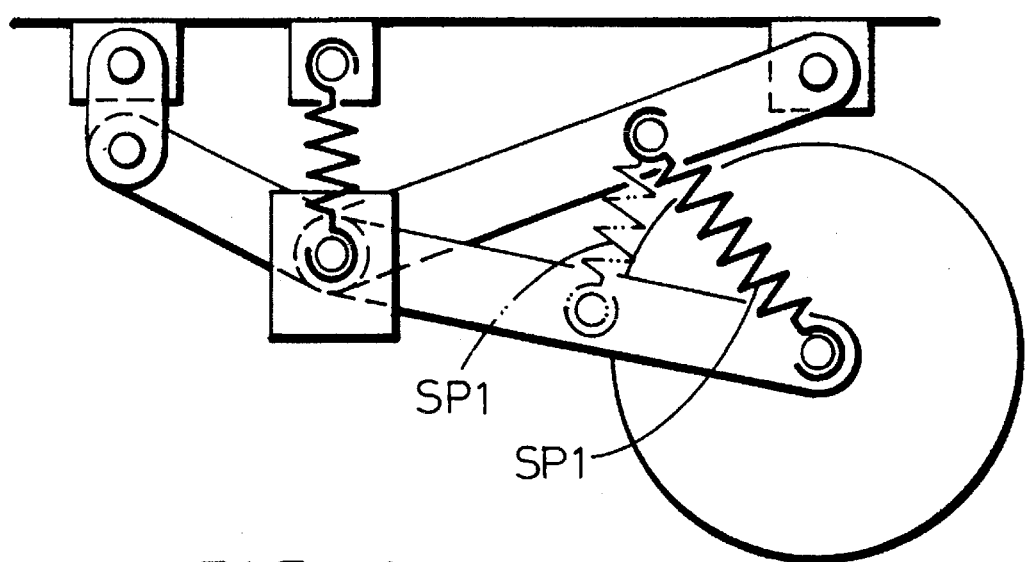
FIG. 6 is a schematic side view of another alternative embodiment of the invention illustrating the location selection of the vibration proof structure.

Regarding the double-acting distributed pressure vibration proof structure embodiments, one end of the vibration spring SP1 can be further installed at the middle section of the second arm A2, while the other end can be installed at the joint hinge structure of the carrier W1 or at the middle section of the first arm shown in FIG. 6 is the second schematic example of the invention illustrating the location selection of the vibration proof structure.

As summarized from the above descriptions, for bearing heavier structures by the dragging arm, the double-acting distributed pressure vibration proof structure has the advantage of better response characteristics than the conventional swing arm vibration proof structure.

I claim:

1. A vibration absorbing linkage system located between relatively movable first and second carriers comprising:
    a) a first arm having a first end portion pivotally attached to the first carrier and a second end;
    b) a second arm having a first end portion pivotally attached to the second carrier and a second end;
    c) a joint hinge structure pivotally interconnecting the second ends of the first and second arms such that the first and second arms form a generally "V"-shaped configuration;
    d) means for limiting the pivoting angle between the second arm and the second carrier, comprising:
        i) a first dragging arm pivotally attached to the second carrier; and,
        ii) a second dragging arm pivotally attached to the joint hinge structure and to the first dragging arm; and,
    e) a first spring connected between the joint hinge structure and the second carrier.

2. The vibration absorbing linkage system of claim 1, further comprising a second spring connected between the first arm and the second carrier.

3. The vibration absorbing linkage system of claim 2, wherein the second spring is connected to the second carrier at the pivot attachment between the second arm and the second carrier.

4. The vibration absorbing linkage system of claim 2, wherein the pivot attachment between the second arm and the second carrier is located between the connection of the second spring and the second carrier, and the connection of the first spring and the second carrier.

5. The vibration absorbing linkage system of claim 2, wherein the connection between the second spring and the second carrier is located between the pivot attachment between the second arm and the second carrier, and the connection between the first spring and the second carrier.

6. The vibration absorbing linkage system of claim 1, further comprising a second spring connected between the first and second arms.

7. The vibration absorbing linkage system of claim 1, wherein a length of the first arm is greater than a length of the second arm.

* * * * *